(12) United States Patent
Kaiser, IV et al.

(10) Patent No.: US 9,471,576 B1
(45) Date of Patent: Oct. 18, 2016

(54) SYSTEMS AND METHODS FOR PROVIDING BACKUP STORAGE INTERFACES

(75) Inventors: Theodore J. Kaiser, IV, Kirkland, WA (US); Gregory R. Dowers, II, Lake Mary, FL (US); Bradley I. Willadsen, Lake Mary, FL (US); James R. Talton, Apopka, FL (US); Jessica Rich, Santee, CA (US)

(73) Assignee: Veritas Technologies, Mountain View, CA (US)

( * ) Notice: Subject to any disclaimer, the term of this patent is extended or adjusted under 35 U.S.C. 154(b) by 1274 days.

(21) Appl. No.: 13/314,557

(22) Filed: Dec. 8, 2011

(51) Int. Cl.
*G06F 17/30* (2006.01)
*G06F 15/16* (2006.01)
*G06F 11/14* (2006.01)

(52) U.S. Cl.
CPC ..... *G06F 17/30073* (2013.01); *G06F 11/1448* (2013.01)

(58) Field of Classification Search
None
See application file for complete search history.

(56) References Cited

U.S. PATENT DOCUMENTS

| | | | |
|---|---|---|---|
| 7,054,892 B1 | 5/2006 | Phillips et al. | |
| 7,631,068 B1 | 12/2009 | Martins | |
| 7,937,546 B2 | 5/2011 | Hiraiwa et al. | |
| 2004/0240097 A1* | 12/2004 | Evans | G11B 15/689 360/69 |
| 2005/0015662 A1 | 1/2005 | Scanlan | |
| 2009/0177990 A1* | 7/2009 | Chen | G06F 3/04847 715/769 |
| 2009/0307236 A1* | 12/2009 | Kramer | G06F 11/1448 |
| 2010/0082505 A1* | 4/2010 | Hollingsworth | G06F 11/328 706/11 |
| 2010/0107104 A1* | 4/2010 | Bruce | G06F 17/30174 715/772 |
| 2011/0041004 A1 | 2/2011 | Miwa et al. | |
| 2012/0011408 A1 | 1/2012 | Swamy et al. | |
| 2012/0303548 A1 | 11/2012 | Johnson et al. | |
| 2013/0086000 A1 | 4/2013 | Mostachetti et al. | |

FOREIGN PATENT DOCUMENTS

WO    WO-2010/010393    1/2010

OTHER PUBLICATIONS

Barker, Shawn; Microsoft Active Directory Backup and Recovery in Windows Server 2008; 2007; Quest Software, Inc.
Gregory R. Dowers, II, et al.; Systems and Methods for Displaying Backup-Status Information for Computing Resources; U.S. Appl. No. 13/356,114, filed Jan. 23, 2012.
Thomas Weaver, et al; Systems and Methods for Simultaneously Configuring Multiple Independent Backups; U.S. Appl. No. 13/358,245, filed Jan. 25, 2012.
Kirk Hartmann Freiheit, et al.; Systems and Methods for Providing Backup Interfaces; U.S. Appl. No. 14/065,389, filed Oct. 28, 2013.
Kirk Hartmann Freiheit et al.; Systems and Methods for Providing Backup Interfaces; U.S. Appl. No. 13/314,517, filed Dec. 8, 2011.
Gregory R. Dowers II et al.; Systems and Methods for Navigating Backup Configurations; U.S. Appl. No. 13/314,538, filed Dec. 8, 2011.

* cited by examiner

*Primary Examiner* — Alex Gofman
(74) *Attorney, Agent, or Firm* — ALG Intellectual Property, LLC

(57) ABSTRACT

A computer-implemented method for providing backup storage interfaces may include (1) identifying a set of backup servers, a set of storage devices, and a set of storage media within a computing environment available to a backup system, (2) identifying a request to view storage information for the backup system, and, in response to the request, (3) displaying, within a graphical user interface, a unified list comprising the set of backup servers, the set of storage devices, and the set of storage media, and (4) displaying, within the unified list, storage capacity information relating to at least one item within the unified list. Various other methods, systems, and computer-readable media are also disclosed.

18 Claims, 7 Drawing Sheets

SYSTEMS AND METHODS FOR PROVIDING BACKUP STORAGE INTERFACES

BACKGROUND

In the digital age, organizations increasingly rely on digitally-stored data. To protect against data loss, an organization may use one or more backup systems to back up important data.

Due to increasingly complex information technology infrastructures, an organization may create backups from a variety of sources, using a variety of methods, and using a variety of storage devices and media. For example, a backup infrastructure may include the use of tape storage, disk storage, cloud storage, and/or a variety of other devices, some of which may use removable storage media.

Unfortunately, managing backup storage using traditional backup administration systems may cost a significant amount of time and effort on the part of an administrator. For example, a backup environment may include so many different storage servers, devices, and media that an administrator may need to sift through a significant amount of data to get a "big picture" understanding of the storage situation in the backup environment. Furthermore, these traditional backup administration systems may present disparate views for the different storage elements within the backup environment, meaning that an administrator may need to choose from and/or switch between multiple views within an interface to get storage information for the backup environment. Accordingly, the instant disclosure addresses a need for additional and improved systems and methods for providing backup storage interfaces.

SUMMARY

As will be described in greater detail below, the instant disclosure generally relates to systems and methods for providing backup storage interfaces by displaying a unified view of the storage elements within a backup environment. In some examples, these systems and methods may present the unified view as a collapsible hierarchy capable of displaying aggregate storage capacity information based on the current state of the hierarchical view. In one example, a computer-implemented method for providing backup storage interfaces may include (1) identifying a set of backup servers, a set of storage devices, and a set of storage media within a computing environment available to a backup system, (2) identifying a request to view storage information for the backup system, and, in response to the request, (3) displaying, within a graphical user interface, a unified list including the set of backup servers, the set of storage devices, and the set of storage media, and (4) displaying, within the unified list, storage capacity information relating to at least one item within the unified list.

In some examples, the unified list may include a collapsible list, wherein a backup server within the set of backup servers includes a parent of the collapsible list and a plurality of storage devices within the set of storage devices include children of the collapsible list, with the backup server having access to the plurality of storage devices. In these examples, displaying the storage capacity information may include (1) displaying an aggregate storage capacity of the plurality of storage devices accessible to the backup server when the collapsible list is collapsed and (2) displaying an individual storage capacity of each storage device within the plurality of storage devices when the collapsible list is expanded. Additionally or alternatively, in these examples, the computer-implemented method may also include (1) identifying a selection of the backup server within the unified list within the graphical user interface, (2) identifying a request within the graphical user interface to display additional detailed information for the selection, and, in response to the request, (3) displaying aggregated detailed information for the plurality of storage devices. The aggregated detailed information may include (1) a backup job configured to use at least one storage device within the plurality of storage devices, (2) a backup history of at least one storage device within the plurality of storage devices, and/or (3) an alert relating to at least one storage device within the plurality of storage devices.

In some embodiments, the unified list may include a collapsible list, wherein a tape library includes a parent of the collapsible list and a plurality of tape storage devices include children of the collapsible list, with the tape library managing the plurality of tape storage devices. In these embodiments, the computer-implemented method may also include (1) identifying a selection of the tape library within the unified list within the graphical user interface, (2) identifying a request within the graphical user interface to display additional detailed information for the selection, and, in response to the request, (3) displaying aggregated detailed information for the plurality of tape storage devices. The aggregated detailed information may include (1) a backup job configured to use at least one tape storage device within the plurality of tape storage devices, (2) a backup history of at least one tape storage device within the plurality of storage devices, and/or (3) an alert relating to at least one tape storage device within the plurality of storage devices.

In some examples, displaying the storage capacity information may include displaying a capacity bar for a displayed item within the unified list, with the capacity bar including: (1) a first segment with a first fill pattern representing storage space consumed on a storage location corresponding to the item, (2) a second segment with a second fill pattern representing free storage space on the storage location below a first threshold, the first threshold representing a storage utilization level configured to trigger an alert, and (3) a third segment with a third fill pattern representing free storage space on the storage location above the first threshold and below a second threshold. In these examples, the computer-implemented method may also include identifying an input event directed at the first threshold of the capacity bar within the graphical user interface and, based on the input event, (1) modifying the first threshold and (2) modifying the storage utilization level configured to trigger the alert.

In at least one example, displaying the set of backup servers within the unified list may include determining that the computing environment includes more than one backup server.

In one embodiment, a system for implementing the above-described method may include an identification module programmed to (1) identify a set of backup servers, a set of storage devices, and a set of storage media within a computing environment available to a backup system and (2) identify a request to view storage information for the backup system. The system may also include an interface module programmed to, in response to the request, (1) display, within a graphical user interface, a unified list including the set of backup servers, the set of storage devices, and the set of storage media, and (2) display, within the unified list, storage capacity information relating to at least one item within the unified list. The system may also include at least one processor configured to execute the identification module and the interface module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a set of backup servers, a set of storage devices, and a set of storage media within a computing environment available to a backup system, (2) identify a request to view storage information for the backup system, and, in response to the request, (3) display, within a graphical user interface, a unified list including the set of backup servers, the set of storage devices, and the set of storage media, and (4) display, within the unified list, storage capacity information relating to at least one item within the unified list.

As will be explained in greater detail below, by displaying a unified view of the storage elements within a backup environment, the systems and methods described herein may improve the efficiency and/or intuitiveness of navigating through storage information in the backup environment. Furthermore, in some examples, by presenting the unified view as a collapsible hierarchy capable of displaying aggregate storage capacity information based on the current state of the hierarchical view, these systems and methods may facilitate transitions between big-picture views and detailed views of storage capacity within the backup environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

The accompanying drawings illustrate a number of exemplary embodiments and are a part of the specification. Together with the following description, these drawings demonstrate and explain various principles of the instant disclosure.

Figure 1:
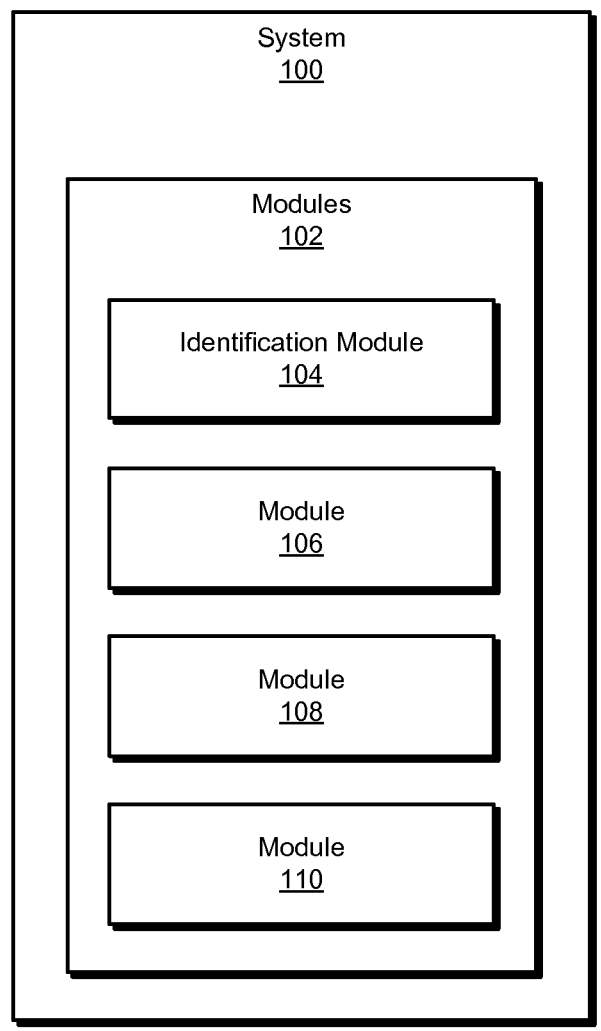
FIG. 1 is a block diagram of an exemplary system for providing backup storage interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
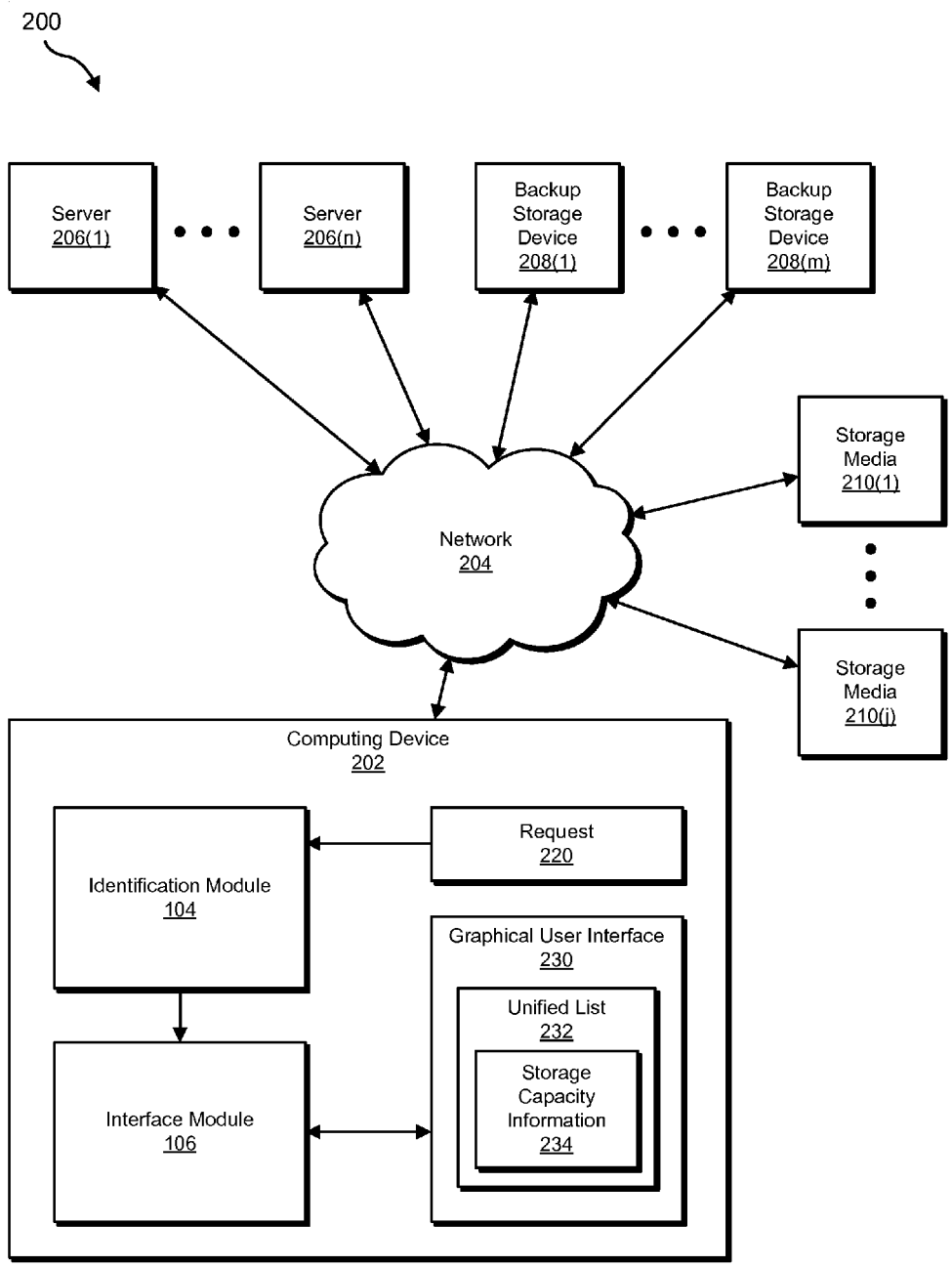
FIG. 2 is a block diagram of an exemplary system for providing backup storage interfaces.

The following will provide, with reference to FIGS. 1-2, detailed descriptions of exemplary systems for providing backup storage interfaces. Detailed descriptions of corresponding computer-implemented methods will also be provided in connection with FIG. 3. Detailed descriptions of an exemplary graphical user interface will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for providing backup storage interfaces. As illustrated in this figure, exemplary system 100 may include one or more modules 102 for performing one or more tasks. For example, and as will be explained in greater detail below, exemplary system 100 may include an identification module 104 programmed to (1) identify a set of backup servers, a set of storage devices, and a set of storage media within a computing environment available to a backup system and (2) identify a request to view storage information for the backup system.

In addition, and as will be described in greater detail below, exemplary system 100 may include an interface module 106 programmed to (1) display, within a graphical user interface, a unified list including the set of backup servers, the set of storage devices, and the set of storage media, and (2) display, within the unified list, storage capacity information relating to at least one item within the unified list. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, servers 206(1)-(n) and/or backup storage devices 208(1)-(m)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with servers 206(1)-(n) and backup storage devices 208(1)-(m) via a network 204. For example, computing device 202 may represent a backup central administration server used to configure and/or display backup information for backing up data from one or more of servers 206(1)-(n) to one or more of storage devices 208(1)-(m) and/or one or more of storage media 210(1)-(j).

In one embodiment, one or more of modules 102 from FIG. 1 may, when executed by at least one processor of computing device 202, facilitate computing device 202 in providing backup storage interfaces. For example, and as will be described in greater detail below, one or more of modules 102 may cause computing device 202 to (1) identify a set of backup servers (e.g., servers 206(1)-(n)), a set of storage devices (e.g., backup storage devices 208(1)-(m)), and a set of storage media (e.g., storage media 210(1)-(j)) within a computing environment available to a backup system (e.g., system 200), (2) identify a request (e.g., a request 220) to view storage information for the backup system, and, in response to the request, (3) display, within a graphical user interface, a unified list including the set of backup servers, the set of storage devices, and the set of storage media (e.g., display, within a graphical user interface 230, a unified list 232), and (4) display, within the unified list, storage capacity information relating to at least one item within the unified list (e.g., display, within unified list 232, storage capacity information 234).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device. In at least one example, computing device 202 may represent a central backup administration server.

Servers 206(1)-(n) generally represent any type or form of computing devices that are capable of storing, managing, and/or processing data. Examples of servers 206(1)-(n) include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and servers 206(1)-(n).

Backup storage devices 208(1)-(m) may each represent portions of individual databases or storage devices or of pluralities of databases or storage devices. For example, one or more of backup storage devices 208(1)-(m) may represent a portion of servers 206(1)-(n) in FIG. 2, computing system 610 in FIG. 6, and/or portions of exemplary network architecture 700 in FIG. 7. Alternatively, backup storage devices 208(1)-(m) in FIG. 1 may represent one or more physically separate devices capable of being accessed by a computing device, such as servers 206(1)-(n) in FIG. 2, computing system 610 in FIG. 6, and/or portions of exemplary network architecture 700 in FIG. 7.

Storage media 210(1)-(j) may each represent one or more media for storing data (e.g., within a media library system). Examples of storage media include, without limitation, storage tapes and disk cartridges.

Figure 3:
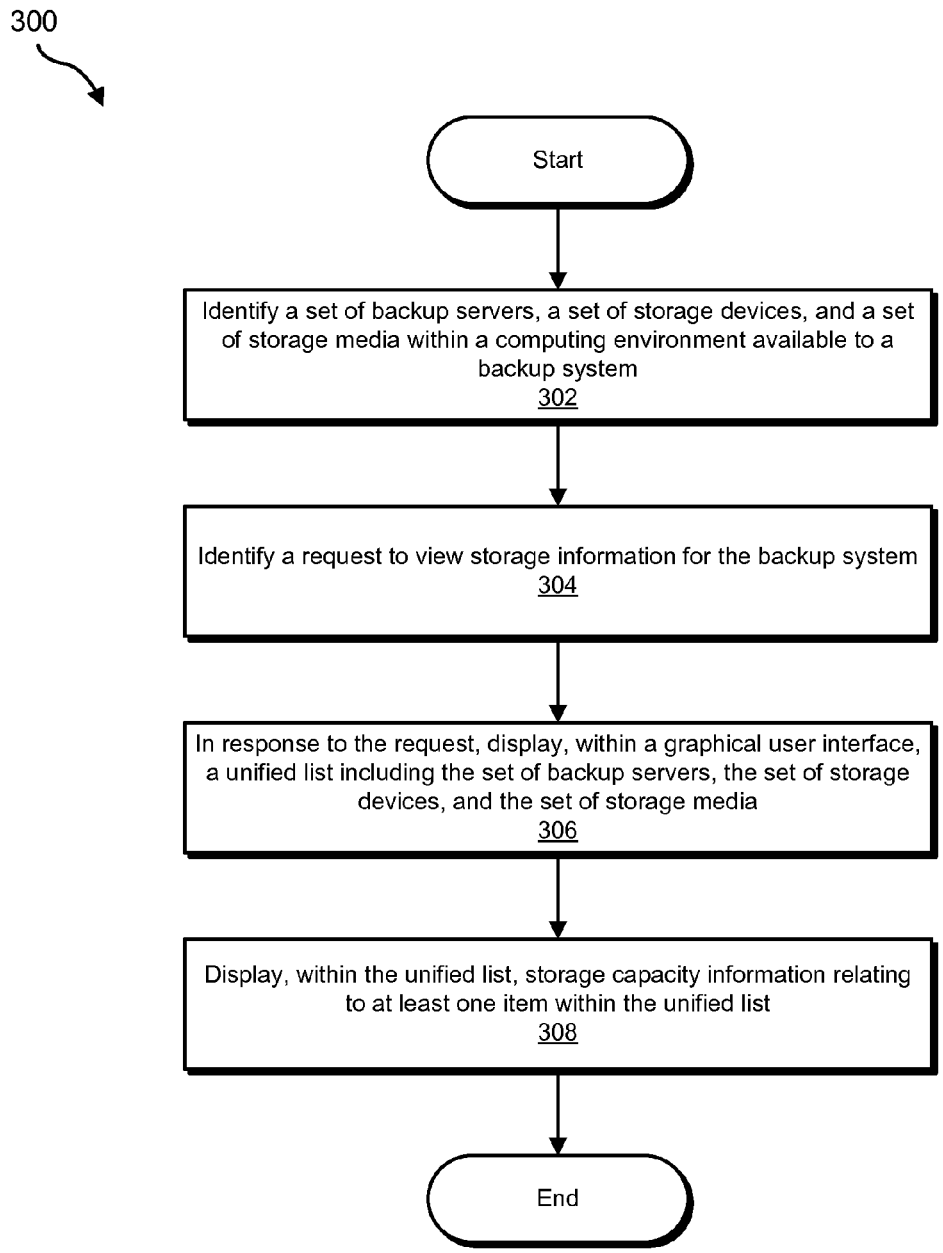
FIG. 3 is a flow diagram of an exemplary method for providing backup storage interfaces.

FIG. 3 is a flow diagram of an exemplary computer-implemented method 300 for providing backup storage interfaces. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a set of backup servers, a set of storage devices, and a set of storage media within a computing environment available to a backup system. For example, at step 302 identification module 104 may, as part of computing device 202 in FIG. 2, identify servers 206(1)-(n), backup storage devices 208(1)-(m), and storage media 210(1)-(j) within system 200.

As used herein, the phrase "backup server" may refer to any computing device used for executing and/or facilitating the execution of one or more backup jobs. In addition, the phrase "backup job" may refer to any configuration, script, and/or specifications for performing one or more backup operations. Similarly, the phrase "backup operation" may include any operation for backing up, protecting, transferring, and/or replicating data. Examples of backup operations include, without limitation, backing up data (e.g., to a disk, a tape, a deduplication data store, etc.), duplicating data (e.g., to a disk, a tape, etc.), archiving data, migrating data, creating a virtual copy of a system, etc. In addition, examples of backup servers include, without limitation, central administration backup servers and media servers.

As used herein, the phrase "storage device" may refer to any of a variety of storage devices. In some examples, the phrase "storage device" may refer to a physical on-site storage device (e.g., a storage disk). Additionally or alternatively, the phrase "storage device" may refer to a logical and/or remote storage device (e.g., cloud storage). In addition, the phrase "storage media" may refer to any media for storing data. For example, the phrase "storage media" may refer to storage tapes, disk cartridges, optical discs, etc. In some examples, the phrase "storage media" may refer to media within a storage library that can be automatically manipulated, accessed, and/or mounted.

As used herein, the phrase "computing environment" may refer to any collection of computing resources (e.g., within an enterprise, an information technology infrastructure, etc.) subject to backup management via a unified backup system. In addition, the phrase "backup system" may refer to any system for backing up data. In some examples, the backup system may also replicate, archive, migrate, and/or virtualize data.

Identification module 104 may identify the backup servers, storage devices, and storage media in any suitable manner. For example, identification module 104 may access configuration data of the backup system to identify computing devices that have been imported for use in the backup system. Additionally or alternatively, identification module 104 may access network topology information identifying one or more computing devices on a network in the computing environment.

Returning to FIG. 3, at step 304 one or more of the systems described herein may identify a request to view storage information for the backup system. For example, at step 304 identification module 104 may, as part of computing device 202 in FIG. 2, identify request 220.

As used herein, the phrase "storage information" may refer to any information relating to storage that is relevant to a backup system within a computing environment. For example, storage information may include information about one or more storage devices and/or storage media, including device and/or media types, storage capacities, and/or one or more backup jobs and/or configuration settings applied to a storage device and/or media.

Identification module 104 may identify the request in any suitable context. For example, identification module 104 may identify the request when a backup administration program is loaded. Additionally or alternatively, identification module 104 may identify the request when an option within the backup administration program is selected and/or a module within the backup administration program is loaded.

Returning to FIG. 3, at step 306 one or more of the systems described herein may display, within a graphical user interface, a unified list including the set of backup servers, the set of storage devices, and the set of storage media. For example, at step 306 interface module 106 may, as part of computing device 202 in FIG. 2, display, within a graphical user interface 230, a unified list 232.

As used herein, the phrase "graphical user interface" may refer to any interface that may allow a user to interact with a computing system. In some examples, the graphical user interface may include an interface for a backup central administration server.

Interface module 106 may display the unified list within the graphical user interface in any of a variety of ways. In some examples, interface module 106 may display the unified list as a hierarchical list. For example, interface module 106 may display the set of backup servers at the top level of the hierarchical list and storage devices used by each backup server as children of the backup servers within the hierarchical list. Similarly, interface module 106 may display an entry for all storage media at the top level of the hierarchical list and various storage media and/or storage media categories as children of the entry.

Figure 4:
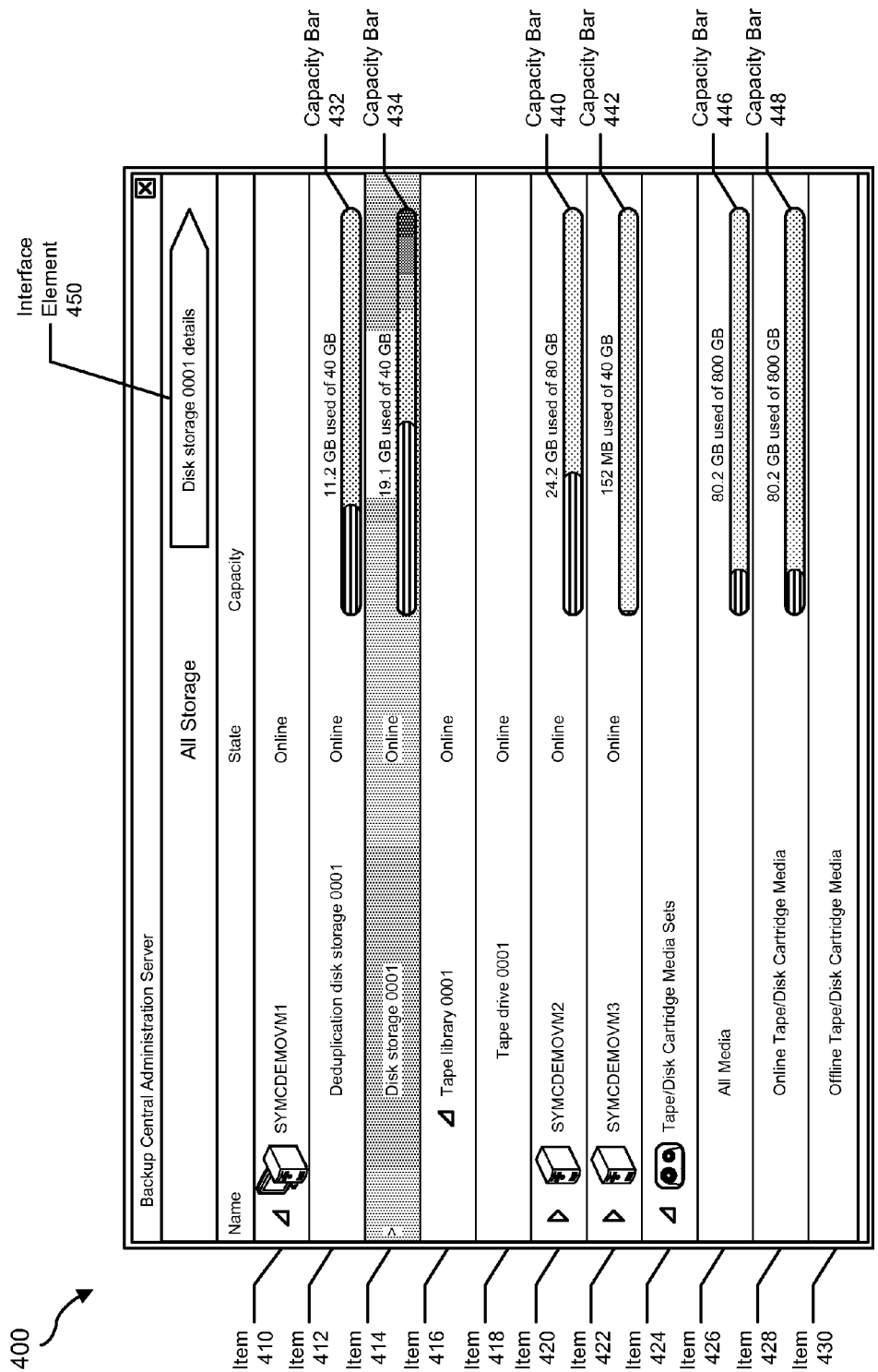
FIG. 4 is a diagram of an exemplary graphical user interface.

FIG. 4 is an illustration of an exemplary graphical user interface 400. Using FIG. 4 as an example, graphical user interface 400 may display one or more backup servers, storage devices, and/or storage media sets in a unified list. For example, graphical user interface 400 may display a unified list with an item 410 (e.g., a backup server) with items 412, 414, and 416 (e.g., storage devices) as children of item 410 (and with an item 418 as a child of item 416). Graphical user interface 400 may also display items 420 and 420 within the unified list. Graphical user interface 400 may also display an item 424 (e.g., representing all backup media) within the unified list, and items 426, 428, and 430 within the unified list as children of item 424 (e.g., various backup media sets and/or categories).

In some examples, the unified list may include a collapsible list. For example, as mentioned above, the unified list may include a hierarchical list and, in this example, a parent item within the hierarchy may be collapsible (e.g., be displayed with or without displaying its children based on a toggled option). In one example, a backup server within the set of backup servers may include a parent of the collapsible list and a plurality of storage devices within the set of storage devices may include children of the collapsible list. In this example, the backup server may have access to the plurality of storage devices (e.g., for storing backup data). Using FIG. 4 as an example, item 410 in graphical user interface 400 may be a collapsible item within the unified list that is currently expanded (e.g., to show items 412, 414, 416, and 418). Items 420 may include collapsible items within the unified list that are currently collapsed (e.g., not currently showing children items, such as storage devices). As will be explained in greater detail below, storage capacity information displayed in conjunction with one or more items within the collapsible list may depend on whether an item is collapsed or not.

In one example, a tape library may include a parent of the collapsible list and a plurality of tape storage devices may include children of the collapsible list. In this example, the tape library may include the plurality of tape storage devices. Using FIG. 4 as an example, item 416 in graphical user interface 400 may be a collapsible item within the unified list that is currently expanded (e.g., to show item 418). Item 420 may include collapsible items within the unified list that are currently collapsed (e.g., not currently showing children items, such as storage devices).

In some examples, interface module 106 may display the set of backup servers within the unified list based at least in part on determining that the computing environment includes more than one backup server. For example, interface module 106 may display a backup server within a hierarchy within the unified list in order to provide a distinctive grouping for storage devices used by the backup server. However, in a simple backup environment (e.g., with one backup server, no backup media, etc.), interface module 106 may simply display a list of storage devices available to the sole backup server.

Returning to FIG. 3, at step 308 one or more of the systems described herein may display, within the unified list, storage capacity information relating to at least one item within the unified list. For example, at step 308 interface module 106 may, as part of computing device 202 in FIG. 2, display, within unified list 232, storage capacity information 234.

As used herein, the phrase "storage capacity information" may refer to any information relating to a storage element within the computing environment. For example, the storage capacity information may include information regarding the storage usage and/or capacity of a storage device, a set of storage devices, a storage media item, a set of storage media, one or more thresholds of storage usage tied to alerts, and/or the storage usage and/or capacity of one or more storage devices used by a backup server.

As mentioned earlier, in one example the unified list may include a collapsible list, where a backup server is a parent in the collapsible list and one or more storage devices are children in the collapsible list. In this example, displaying the storage capacity information may include displaying an aggregate storage capacity of the plurality of storage devices accessible to the backup server when the collapsible list is collapsed and displaying an individual storage capacity of each storage device within the plurality of storage devices when the collapsible list is expanded. Using FIG. 4 as an example, graphical user interface 400 may include capacity bars 432, 434, 440, 442, 446, and 448. As shown in FIG. 4, item 410 may be expanded, showing items 412 and 414. Accordingly, graphical user interface 400 may display capacity bar 432 alongside item 412 to show that 11.2 GB is used out of a total capacity of 40 GB for item 412. Likewise, graphical user interface 400 may display capacity bar 434 alongside item 414 to show that 19.1 GB is used out of a total capacity of 40 GB for item 414. In this example, a user may collapse item 410. Graphical user interface 400 may then display a capacity bar alongside item 410 showing that 30.3 GB is used out of a total capacity of 80 GB for storage devices used by item 410. Similarly, collapsed items 420 and 422 may show capacity bars 440 and 442, respectively, representing aggregate capacity information of their respective children within the unified list. As another example, item 424 may be expanded, showing items 426 and 428. Graphical user interface 400 may, accordingly, display capacity bars 446 and 448 alongside items 426 and 428, respectively. In this example, a user may collapse item 424, and graphical user interface 400 may display a capacity bar alongside item 424 to show aggregate information (in this case, showing the same information as the already aggregated item 426—i.e., 80.2 GB used out of 800 GB).

As mentioned above, in some examples the storage capacity information may include a capacity bar. In these examples, interface module 106 may display the storage capacity information by displaying a capacity bar for a displayed item within the unified list. The capacity bar may include any suitable representation of storage usage and/or capacity. In one example, the capacity bar may include multiple segments. For example, the capacity bar may include a first segment with a first fill pattern representing storage space consumed on a storage location corresponding to the item. The capacity bar may also include a second segment with a second fill pattern representing free storage space on the storage location below a first threshold, the first threshold representing a storage utilization level configured to trigger an alert. The capacity bar may also include a third segment with a third fill pattern representing free storage space on the storage location above the first threshold and below a second threshold. In some examples, the second threshold may include another threshold representing an additional storage utilization level configured to trigger an alert. Additionally or alternatively, the second threshold may include the full capacity of the displayed item. As used here, the phrase "fill pattern" may refer to any pattern, color, shade, gradient, and/or other visual effect to visually separate one segment from another segment.

Figure 5:
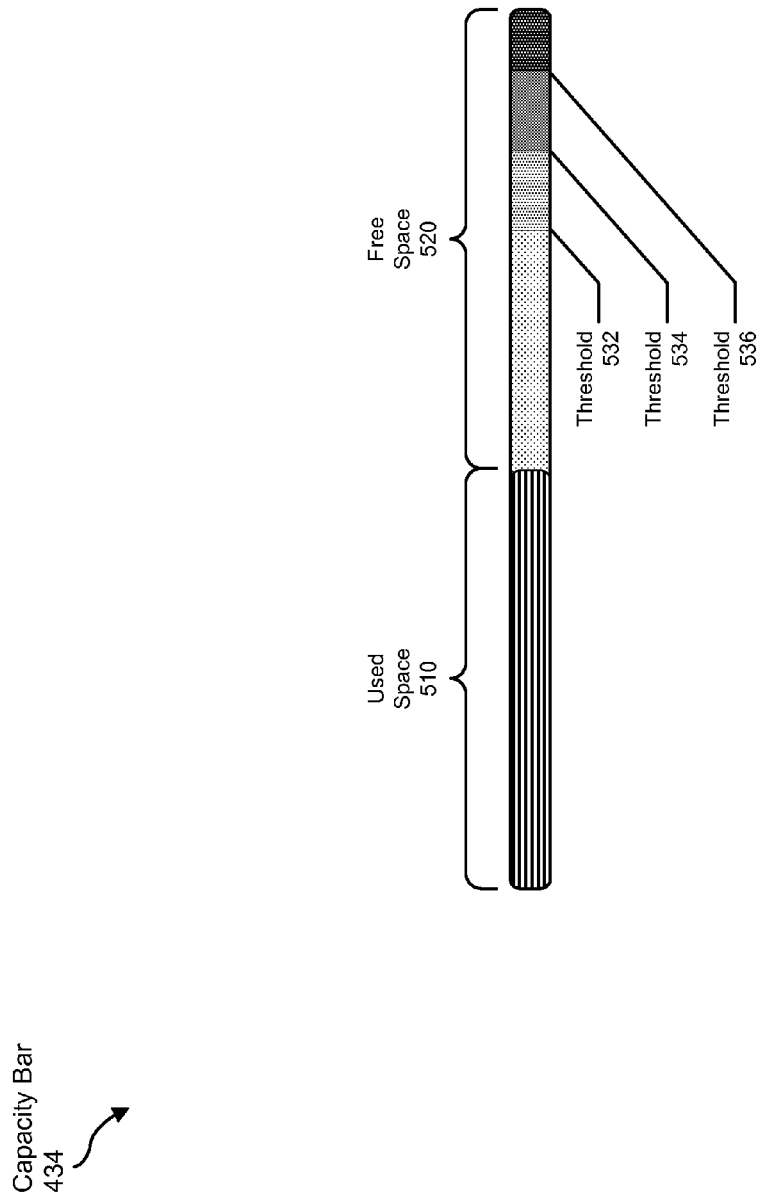
FIG. 5 is a diagram of an exemplary capacity bar within an exemplary graphical user interface.

Using FIG. 4 as an example, capacity bar 434 may include multiple segments. FIG. 5 provides another illustration of capacity bar 434. As shown in FIG. 5, capacity bar 434 may include a segment to represent used space 510 and multiple segments to represent free space 520. For example, within free space 520, a first segment may extend to threshold 532. Once the usage of item 414 (e.g., "disk storage 0001") reaches the equivalent of threshold 532 (e.g., such that used space 510 extends to threshold 532), graphical user interface 400 and/or one or more portions of the backup system may provide an alert (e.g., that free space on "disk storage 0001" is low). Likewise, threshold 534 may represent a utilization level triggering another (e.g., more urgent) alert, and threshold 536 may represent a utilization level triggering yet another (e.g., yet more urgent) alert.

In some examples, the capacity bar may be used as an input element to modify alert thresholds. For example, interface module 106 may identify an input event directed at the first threshold of the capacity bar within the graphical user interface and, based on the input event, modify the first threshold and modify the storage utilization level configured to trigger the alert. The input event may include any suitable input. For example, the input event may include clicking on and dragging the threshold within the capacity bar with a pointer. Alternatively, the input event may include a keyboard event (e.g., using arrow keys when the threshold is highlighted within the capacity bar). After step 308, method 300 may terminate.

As mentioned earlier, in one example the unified list may include a collapsible list, where a backup server is a parent in the collapsible list and one or more storage devices are children in the collapsible list. In this example, one or more of the systems and methods described herein may display aggregated information for the storage devices. For example, interface module 106 may (1) identify a selection of the backup server within the unified list within the graphical user interface, (2) identify a request within the graphical user interface to display additional detailed information for the selection, and, in response to the request, (3) display aggregated detailed information for the plurality of storage devices. The aggregated detailed information may include any of a variety of information relating to the plurality of storage devices. For example, the aggregated detailed information may include a backup job configured to use at least one storage device within the plurality of storage devices (e.g., the aggregated detailed information may include all backup jobs configured to use any storage device within the plurality of storage devices). In some examples, the aggregated backup information may include a backup history of at least one storage device within the plurality of storage devices (e.g., the aggregated detailed information may include a combined backup history of all storage devices within the plurality of storage devices). In one example, the aggregated backup information may include an alert relating to at least one storage device within the plurality of storage devices (e.g., the aggregated backup information may include all alerts relating to any storage device within the plurality of storage devices). Using FIG. 4 as an example, a user may select item 410. An interface element 450 may then change to display "SYMCDE-MOVM1 details." The user may then interact with (e.g., click on) interface element 450 to show aggregated details of items 412, 414, 416, and 418.

Similarly, as mentioned earlier, in one example the unified list may include a collapsible list, where a tape library is a parent in the collapsible list and one or more tape storage devices are children in the collapsible list. In this example, one or more of the systems and methods described herein may display aggregated information for the tape storage devices. For example, interface module 106 may (1) identify a selection of the tape library within the unified list within the graphical user interface, (2) identify a request within the graphical user interface to display additional detailed information for the selection, and, in response to the request, (3) display aggregated detailed information for the plurality of tape storage devices. The aggregated detailed information may include any of a variety of information relating to the plurality of tape storage devices. For example, the aggregated detailed information may include a backup job configured to use at least one storage device within the plurality of tape storage devices (e.g., the aggregated detailed information may include all backup jobs configured to use any tape storage device within the plurality of tape storage devices). In some examples, the aggregated backup information may include a backup history of at least one tape storage device within the plurality of tape storage devices (e.g., the aggregated detailed information may include a combined backup history of all tape storage devices within the plurality of tape storage devices). In one example, the aggregated backup information may include an alert relating to at least one tape storage device within the plurality of tape storage devices (e.g., the aggregated backup information may include all alerts relating to any tape storage device within the plurality of tape storage devices).

In some examples, interface module 106 may display a tool-tip when a mouse pointer hovers over the capacity bar. For example, the tool-tip may display the total capacity of a storage device, the amount of backup data on the storage device, the amount of other data stored on the storage device, available space on the storage device, and/or reserved space on the storage device. Additionally or alternatively, the tool-tip may provide details explaining the fill patterns of one or more segments within the capacity bar.

As explained above, by displaying a unified view of the storage elements within a backup environment, the systems and methods described herein may improve the efficiency and/or intuitiveness of navigating through storage information in the backup environment. Furthermore, in some examples, by presenting the unified view as a collapsible hierarchy capable of displaying aggregate storage capacity information based on the current state of the hierarchical view, these systems and methods may facilitate transitions between big-picture views and detailed views of storage capacity within the backup environment.

Figure 6:
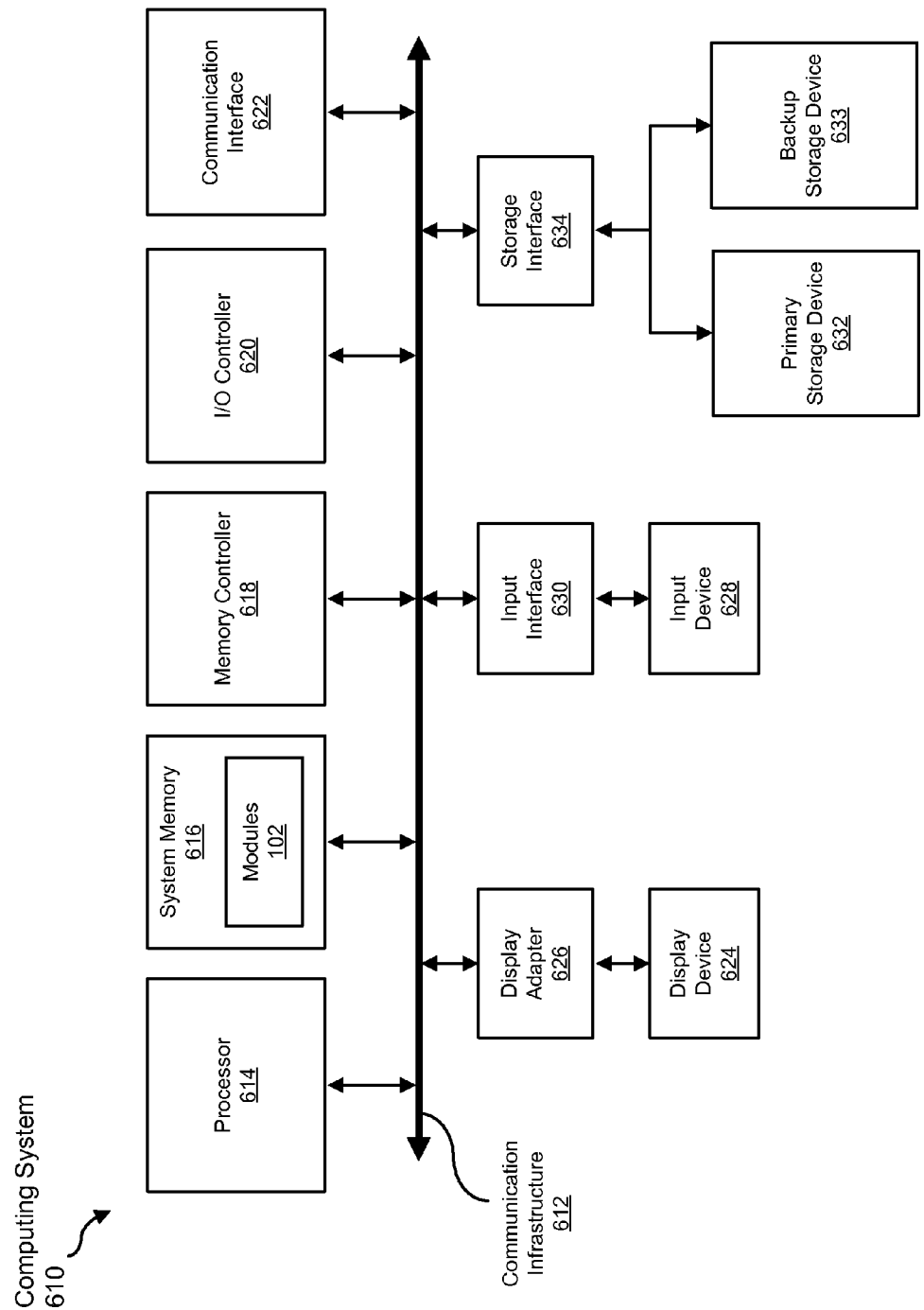
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, displaying, and determining steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
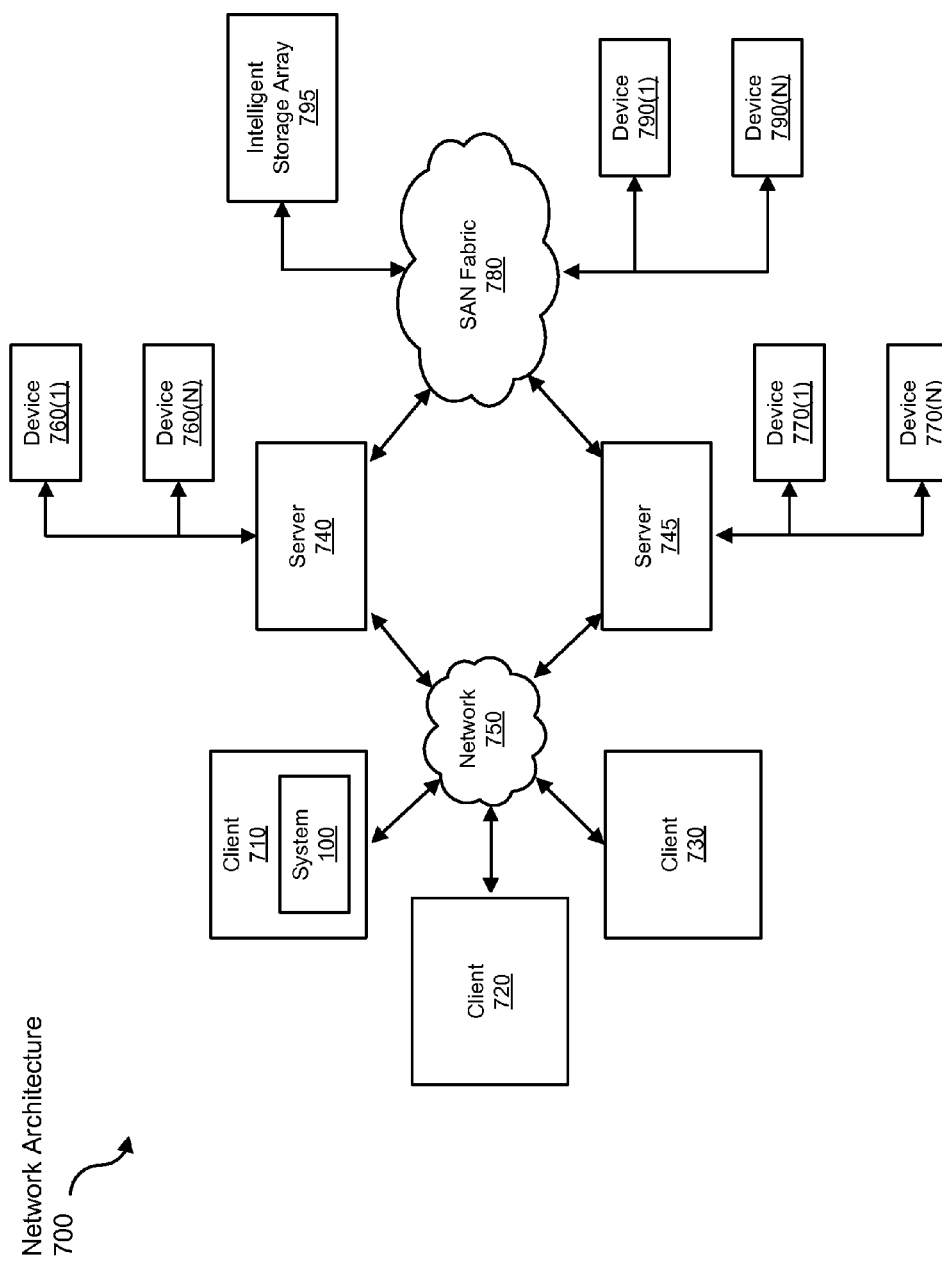
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, displaying, and determining steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for providing backup storage interfaces.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for providing backup storage interfaces.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing backup storage interfaces, at least a portion of the method being performed by a computing device comprising at least one processor, the method comprising:
   identifying a set of backup servers, a set of storage devices, and a set of removable storage media within a computing environment available to a backup system;
   identifying a request to view storage information for the backup system;
   in response to the request:
   displaying, within a graphical user interface, a unified list comprising the set of backup servers, the set of storage devices, and the set of removable storage media, wherein:
   at least one identified storage device within the set of storage devices has stored backup data on at least one identified removable storage medium within the set of removable storage media;
   the identified storage device and the identified removable storage medium are distinctly listed elements within the unified list;
   the unified list comprises a hierarchical list with the set of backup servers at a top level of the hierarchical list;
   the hierarchical list comprises at least one removable storage media storage device from the set of storage devices listed as a child of a parent backup server within the set of backup servers, the parent backup server being configured to use the removable storage media storage device for backing up to at least one corresponding removable storage medium in the set of removable storage media;
   the hierarchical list comprises the set of removable storage media as a group at a top level of the hierarchical list, the set of removable storage media comprising the corresponding removable storage medium;
   displaying, within the unified list, storage capacity information relating to at least one item within the unified list;
   wherein displaying the storage capacity information comprises displaying a capacity bar for a displayed item within the unified list, the capacity bar comprising:
   a first segment with a first fill pattern representing storage space consumed on a storage location corresponding to the item;
   a second segment with a second fill pattern representing free storage space on the storage location below a first threshold, the first threshold representing a storage utilization level configured to trigger an alert;
   a third segment with a third fill pattern representing free storage space on the storage location above the first threshold and below a second threshold; and
   identifying an input event directed at the first threshold of the capacity bar within the graphical user interface;

based on the input event:
  modifying the first threshold;
  modifying the storage utilization level configured to trigger the alert.

2. The computer-implemented method of claim 1, wherein the unified list comprises a collapsible list, wherein a backup server within the set of backup servers comprises a parent of the collapsible list and a plurality of storage devices within the set of storage devices comprise children of the collapsible list, the backup server having access to the plurality of storage devices.

3. The computer-implemented method of claim 2, wherein displaying the storage capacity information comprises:
  displaying an aggregate storage capacity of the plurality of storage devices accessible to the backup server when the collapsible list is collapsed;
  displaying an individual storage capacity of each storage device within the plurality of storage devices when the collapsible list is expanded.

4. The computer-implemented method of claim 2, further comprising:
  identifying a selection of the backup server within the unified list within the graphical user interface;
  identifying a request within the graphical user interface to display additional detailed information for the selection;
  in response to the request to display additional detailed information for the selection, displaying aggregated detailed information for the plurality of storage devices.

5. The computer-implemented method of claim 4, wherein the aggregated detailed information comprises at least one of:
  a backup job configured to use at least one storage device within the plurality of storage devices;
  a backup history of at least one storage device within the plurality of storage devices;
  an alert relating to at least one storage device within the plurality of storage devices.

6. The computer-implemented method of claim 1, wherein the unified list comprises a collapsible list, wherein a tape library comprises a parent of the collapsible list and a plurality of tape storage devices comprise children of the collapsible list, the tape library managing the plurality of tape storage devices.

7. The computer-implemented method of claim 6, further comprising:
  identifying a selection of the tape library within the unified list within the graphical user interface;
  identifying a request within the graphical user interface to display additional detailed information for the selection;
  in response to the request to display additional detailed information for the selection, displaying aggregated detailed information for the plurality of tape storage devices.

8. The computer-implemented method of claim 7, wherein the aggregated detailed information comprises at least one of:
  a backup job configured to use at least one tape storage device within the plurality of tape storage devices;
  a backup history of at least one tape storage device within the plurality of storage devices;
  an alert relating to at least one tape storage device within the plurality of storage devices.

9. The computer-implemented method of claim 1, wherein displaying the set of backup servers within the unified list comprises determining that the computing environment comprises more than one backup server.

10. A system for providing backup storage interfaces, the system comprising:
  an identification module programmed to:
    identify a set of backup servers, a set of storage devices, and a set of removable storage media within a computing environment available to a backup system;
    identify a request to view storage information for the backup system;
  an interface module programmed to, in response to the request:
  display, within a graphical user interface, a unified list comprising the set of backup servers, the set of storage devices, and the set of removable storage media, wherein:
  at least one identified storage device within the set of storage devices has stored backup data on at least one identified removable storage medium within the set of removable storage media;
  the identified storage device and the identified removable storage medium are distinctly listed elements within the unified list;
  the unified list comprises a hierarchical list with the set of backup servers at a top level of the hierarchical list;
  the hierarchical list comprises at least one removable storage media storage device from the set of storage devices listed as a child of a parent backup server within the set of backup servers, the parent backup server being configured to use the removable storage media storage device for backing up to at least one corresponding removable storage medium in the set of removable storage media;
  the hierarchical list comprises the set of removable storage media as a group at a top level of the hierarchical list, the set of removable storage media comprising the corresponding removable storage medium;
  display, within the unified list, storage capacity information relating to at least one item within the unified list;
  wherein displaying the storage capacity information comprises displaying a capacity bar for a displayed item within the unified list, the capacity bar comprising:
  a first segment with a first fill pattern representing storage space consumed on a storage location corresponding to the item;
  a second segment with a second fill pattern representing free storage space on the storage location below a first threshold, the first threshold representing a storage utilization level configured to trigger an alert;
  a third segment with a third fill pattern representing free storage space on the storage location above the first threshold and below a second threshold; and
  identifying an input event directed at the first threshold of the capacity bar within the graphical user interface;
  based on the input event:
  modifying the first threshold;
  modifying the storage utilization level configured to trigger the alert;
  at least one processor configured to execute the identification module and the interface module.

11. The system of claim 10, wherein the unified list comprises a collapsible list, wherein a backup server within the set of backup servers comprises a parent of the collapsible list and a plurality of storage devices within the set of storage devices comprise children of the collapsible list, the backup server having access to the plurality of storage devices.

12. The system of claim 11, wherein the interface module is programmed to display the storage capacity information by:
  displaying an aggregate storage capacity of the plurality of storage devices accessible to the backup server when the collapsible list is collapsed;
  displaying an individual storage capacity of each storage device within the plurality of storage devices when the collapsible list is expanded.

13. The system of claim 11, wherein the interface module is further programmed to:
  identify a selection of the backup server within the unified list within the graphical user interface;
  identify a request within the graphical user interface to display additional detailed information for the selection;
  in response to the request to display additional detailed information for the selection, display aggregated detailed information for the plurality of storage devices.

14. The system of claim 13, wherein the aggregated detailed information comprises at least one of:
  a backup job configured to use at least one storage device within the plurality of storage devices;
  a backup history of at least one storage device within the plurality of storage devices;
  an alert relating to at least one storage device within the plurality of storage devices.

15. The system of claim 10, wherein the unified list comprises a collapsible list, wherein a tape library comprises a parent of the collapsible list and a plurality of tape storage devices comprise children of the collapsible list, the tape library managing the plurality of tape storage devices.

16. The system of claim 15, wherein the interface module is further programmed to:
  identify a selection of the tape library within the unified list within the graphical user interface;
  identify a request within the graphical user interface to display additional detailed information for the selection;
  in response to the request to display additional detailed information for the selection, display aggregated detailed information for the plurality of tape storage devices.

17. The system of claim 16, wherein the aggregated detailed information comprises at least one of:
  a backup job configured to use at least one tape storage device within the plurality of tape storage devices;
  a backup history of at least one tape storage device within the plurality of storage devices;
  an alert relating to at least one tape storage device within the plurality of storage devices.

18. A non-transitory computer-readable-storage medium comprising one or more computer-executable instructions that, when executed by at least one processor of a computing device, cause the computing device to:
  identify a set of backup servers, a set of storage devices, and a set of removable storage media within a computing environment available to a backup system;
  identify a request to view storage information for the backup system;
  in response to the request:
  display, within a graphical user interface, a unified list comprising the set of backup servers, the set of storage devices, and the set of removable storage media, wherein:
  at least one identified storage device within the set of storage devices has stored backup data on at least one identified removable storage medium within the set of removable storage media;
  the identified storage device and the identified removable storage medium are distinctly listed elements within the unified list;
  the unified list comprises a hierarchical list with the set of backup servers at a top level of the hierarchical list;
  the hierarchical list comprises at least one removable storage media storage device from the set of storage devices listed as a child of a parent backup server within the set of backup servers, the parent backup server being configured to use the removable storage media storage device for backing up to at least one corresponding removable storage medium in the set of removable storage media;
  the hierarchical list comprises the set of removable storage media as a group at a top level of the hierarchical list, the set of removable storage media comprising the corresponding removable storage medium;
  display, within the unified list, storage capacity information relating to at least one item within the unified list;
  wherein displaying the storage capacity information comprises displaying a capacity bar for a displayed item within the unified list, the capacity bar comprising:
  a first segment with a first fill pattern representing storage space consumed on a storage location corresponding to the item;
  a second segment with a second fill pattern representing free storage space on the storage location below a first threshold, the first threshold representing a storage utilization level configured to trigger an alert;
  a third segment with a third fill pattern representing free storage space on the storage location above the first threshold and below a second threshold; and
  identifying an input event directed at the first threshold of the capacity bar within the graphical user interface;
  based on the input event:
  modifying the first threshold;
  modifying the storage utilization level configured to trigger the alert.

* * * * *